US012791412B2

(12) United States Patent
Santana Dos Santos et al.

(10) Patent No.: US 12,791,412 B2
(45) Date of Patent: Nov. 10, 2026

(54) FLEXIBLE PRESSURE OR STRAIN MAPPING DEVICE, METHOD OF PREPARATION THEREOF, PRESSURE MAPPING SYSTEM, COMPUTER-IMPLEMENTED METHOD OF DIGITALIZATION AND VISUALIZATION IN REAL-TIME OF GRAPHICAL REPRESENTATIONS, COMPUTER PROGRAM, AND COMPUTER-READABLE DATA CARRIER

(71) Applicant: ASSOCIAÇÃO ALMASCIENCE—INVESTIGAÇÃO E DESENVOLVIMENTO EM CELULOSE PARA APLICACOES INTELIGENTES E, Caparica (PT)

(72) Inventors: Andreia Sofia Santana Dos Santos, Aldeia de Paio Pires (PT); João Avelãs Resende, Costa de Caparica (PT); Felisberto Sequeira Pereira, Lisbon (PT); Mariana Sofia Brigida Matias, Covilhã (PT); Tomás Miguel Santos Silva Freire, Odivelas (PT); Fausto Daniel Dos Santos Queda, Lisbon (PT); Bruno Miguel Ribeiro Veigas, Alhandra (PT); Diana Filipa Pereira Gaspar, Leiria (PT); Alexandra Sofia Dias Lopes, Leiria (PT); Wilson Miguel Cavaco Santos, Olival Basto (PT); Luis Miguel Nunes Pereira, Charneca da Carapica (PT)

(73) Assignee: ASSOCIAÇÃO ALMASCIENCE—INVESTIGAÇÃO E DESENVOLVIMENTO EM CELULOSE PARA APLICACOES INTELIGENTES E SUSTENT ÀVEIS, Caparica (PT)

( * ) Notice: Subject to any disclaimer, the term of this patent is extended or adjusted under 35 U.S.C. 154(b) by 227 days.

(21) Appl. No.: 18/849,397

(22) PCT Filed: Mar. 22, 2023

(86) PCT No.: PCT/IB2023/052822
§ 371 (c)(1),
(2) Date: Sep. 20, 2024

(87) PCT Pub. No.: WO2023/180959
PCT Pub. Date: Sep. 28, 2023

(65) Prior Publication Data

US 2025/0198866 A1 Jun. 19, 2025

(30) Foreign Application Priority Data

Mar. 24, 2022 (PT) ........................................ 117876

(51) Int. Cl.
*G01L 5/171* (2020.01)
*G01L 1/18* (2006.01)
*G01L 5/162* (2020.01)

(52) U.S. Cl.
CPC ................ *G01L 5/171* (2020.01); *G01L 1/18* (2013.01); *G01L 5/162* (2013.01)

(58) Field of Classification Search
CPC ........................................................ G01L 1/18
See application file for complete search history.

(56) References Cited

U.S. PATENT DOCUMENTS 9,851,267 B1 12/2017 Ma et al.
10,663,358 B2 * 5/2020 Madden ................. G01L 11/00
(Continued)

FOREIGN PATENT DOCUMENTS

CN 110105590 B 9/2021
WO WO-2016/141468 A1 9/2016

OTHER PUBLICATIONS

Zhang, Yun-Fei et al. "Flexible, stretchable and conductive PVA/

PEDOT:PSS composite hydrogels prepared by SIPN strategy" Polymer Testing, 81 (Jan. 2020) 106213, 8 pages.
(Continued)

*Primary Examiner* — Erika J. Villaluna
(74) *Attorney, Agent, or Firm* — MUNCY, GEISSLER, OLDS & LOWE, P.C.

(57) ABSTRACT

The invention refers to a flexible pressure or strain mapping device comprising a fibrous substrate layer (1), which comprises at least a layer zone impregnated with a hydrogel (2); a first sensor electrode (3) having a portion contacting at least a lower part of said layer zone impregnated with a hydrogel (2); a second sensor electrode (4) having a portion contacting at least an upper part of said layer zone impregnated with a hydrogel (2).

The flexible pressure or strain mapping device comprises hydrogels that are flexible, and have higher performance regarding mechanical and sensing properties, considering that said materials are easily tuned, so they can be stretchable and biocompatible and may show self-healing properties. Furthermore, the flexible pressure or strain mapping device can be arranged in arrays, to map a pressure distribution and provide a more precise output in several applications.

21 Claims, 8 Drawing Sheets

(56) References Cited

U.S. PATENT DOCUMENTS

| | | | |
|---|---|---|---|
| 2012/0323501 | A1 | 12/2012 | Sarrafzadeh et al. |
| 2015/0331533 | A1 | 11/2015 | McMillen |

OTHER PUBLICATIONS

Wang, Zhenwu et al. "Ultrastretchable Strain Sensors and Arrays with High Sensitivity and Linearity Based on Super Tough Conductive Hydrogels" Chemistry of Materials, 2018, 30, pp. 8062-8069.

* cited by examiner

[Fig. 1]
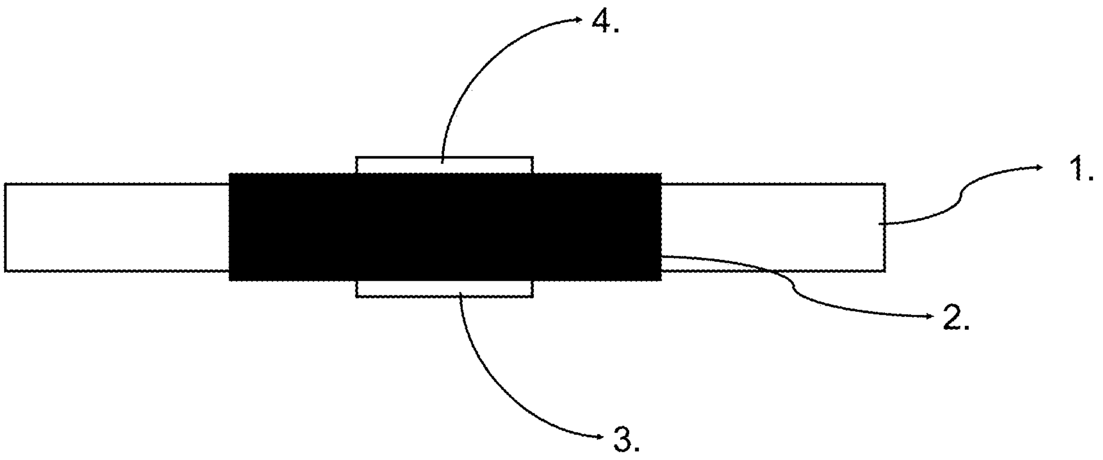
[Fig. 2]
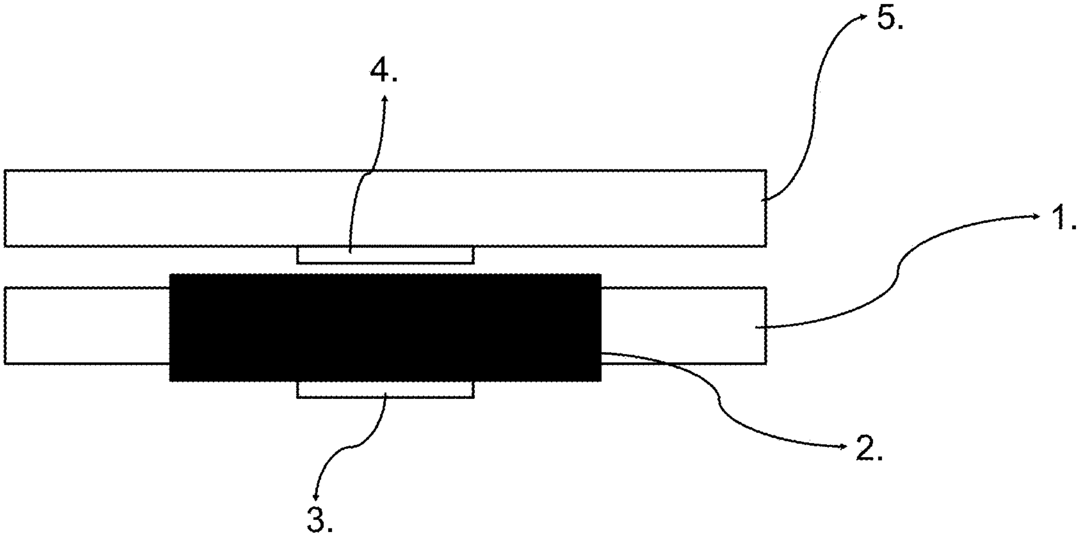

[Fig. 3]
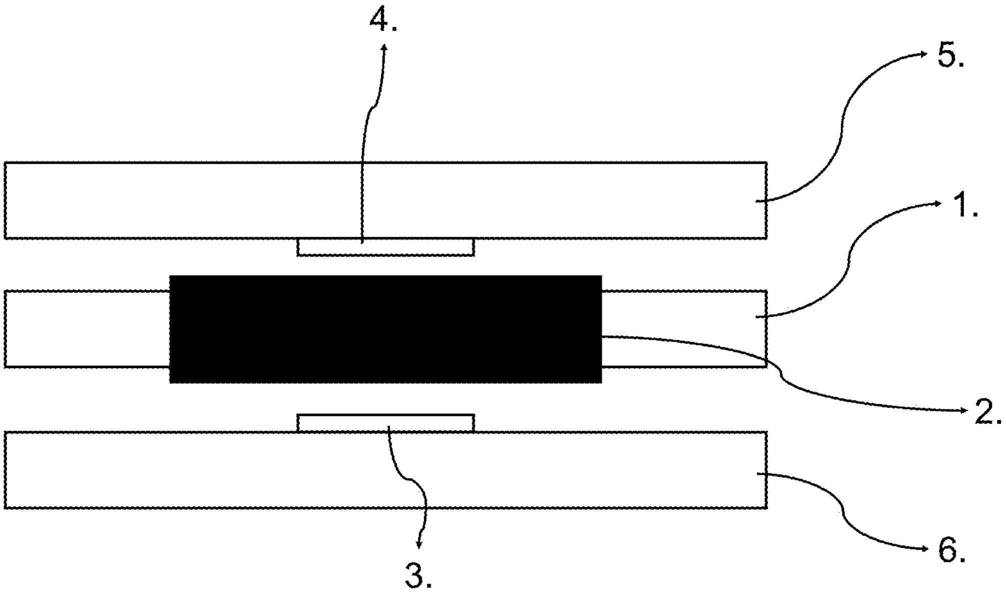
[Fig. 4]
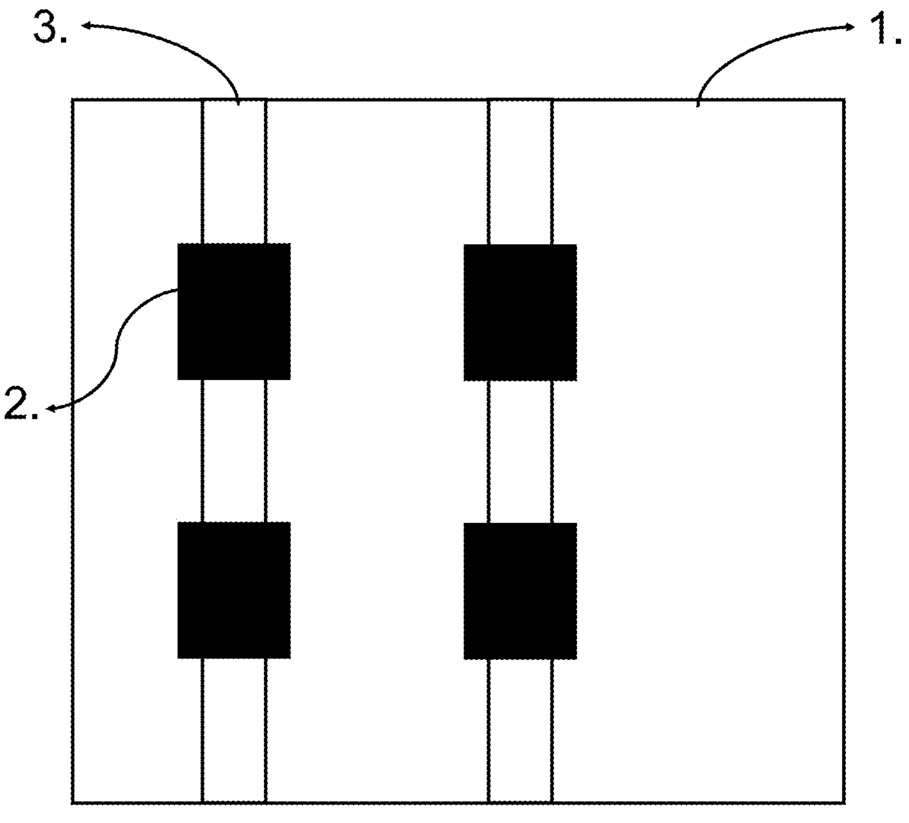

[Fig. 5]
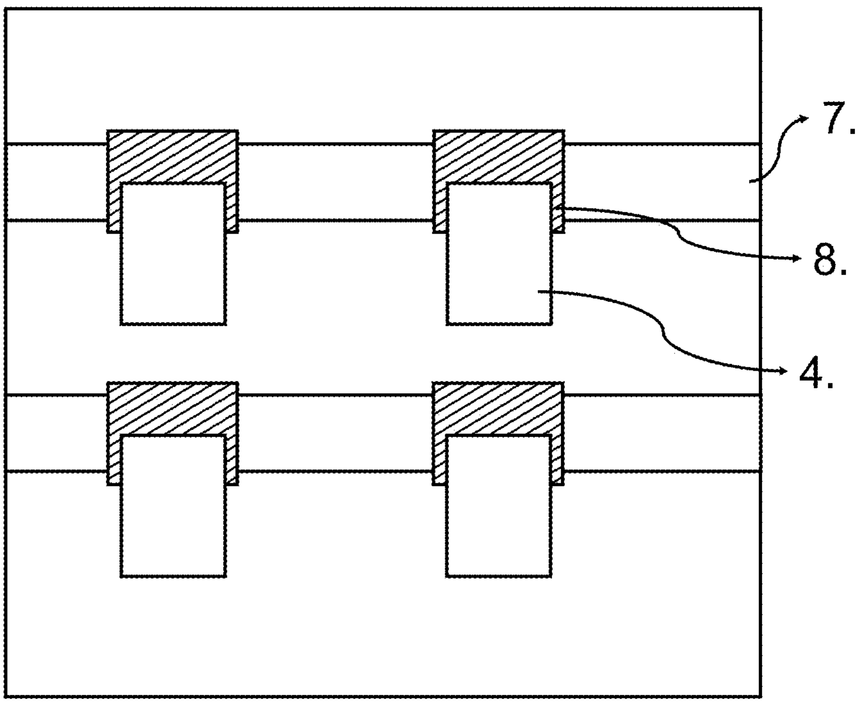
[Fig. 6]
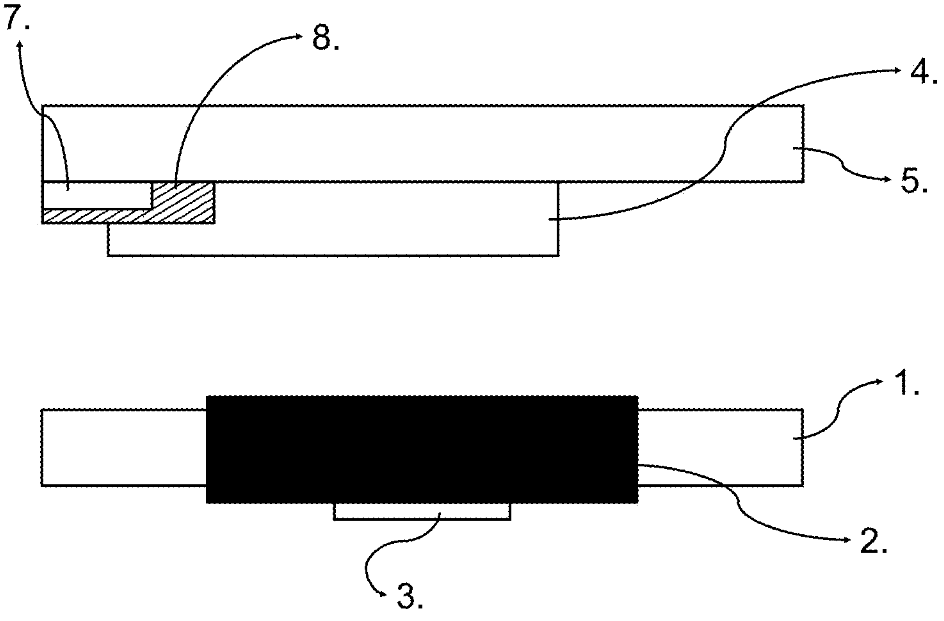

[Fig. 7]
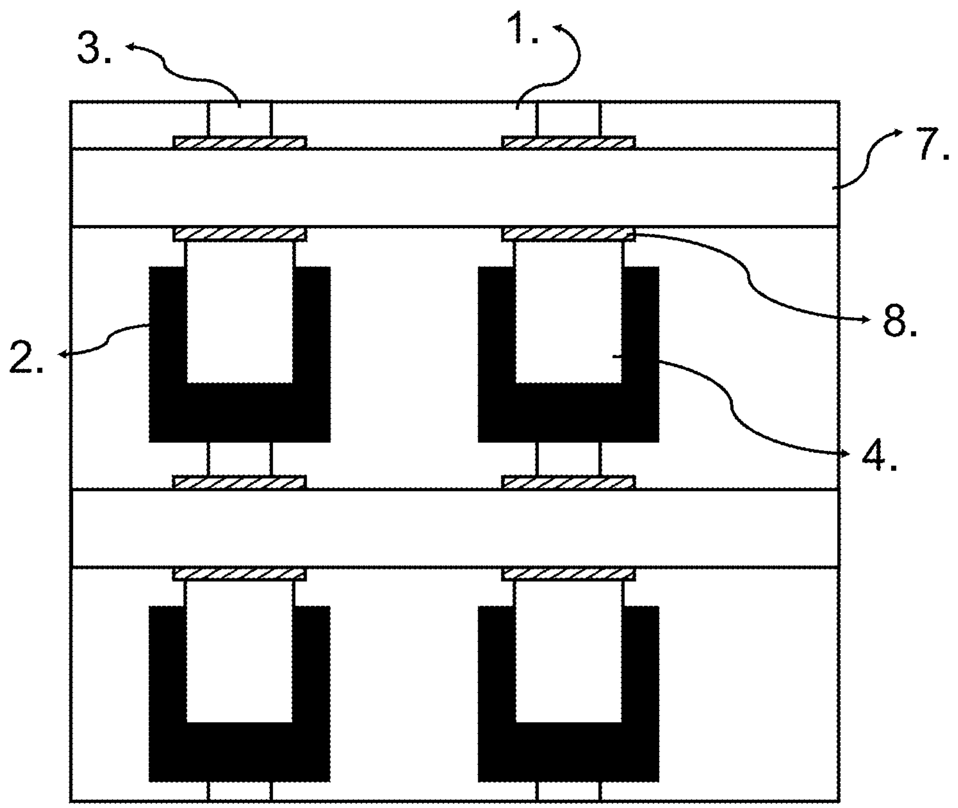
[Fig. 8]
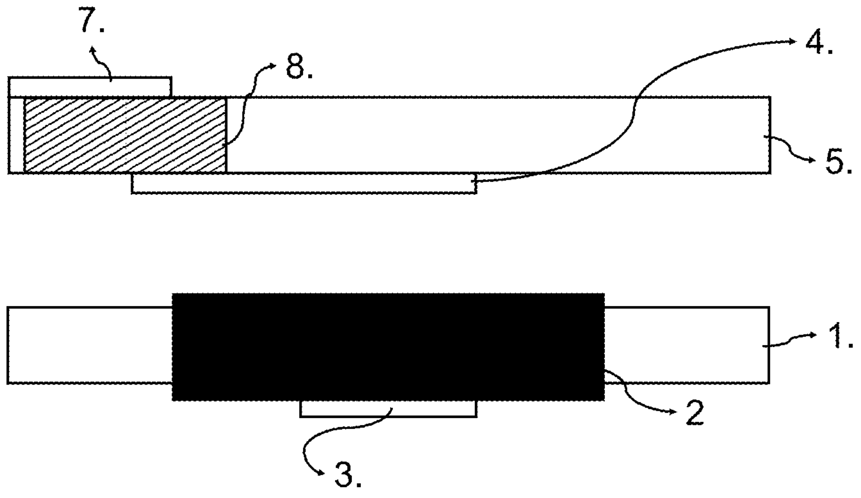

[Fig. 9]
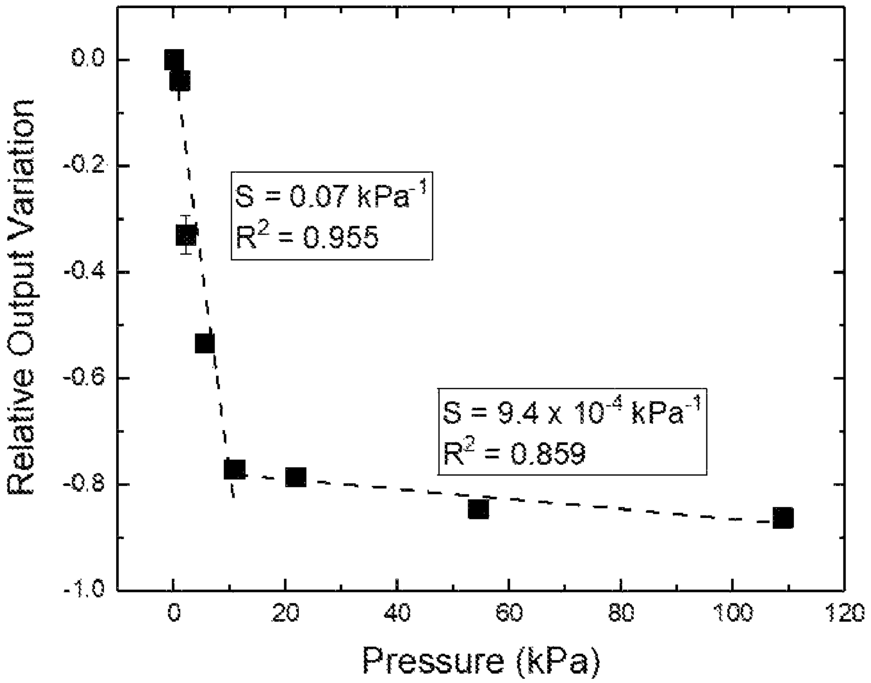
[Fig. 10]
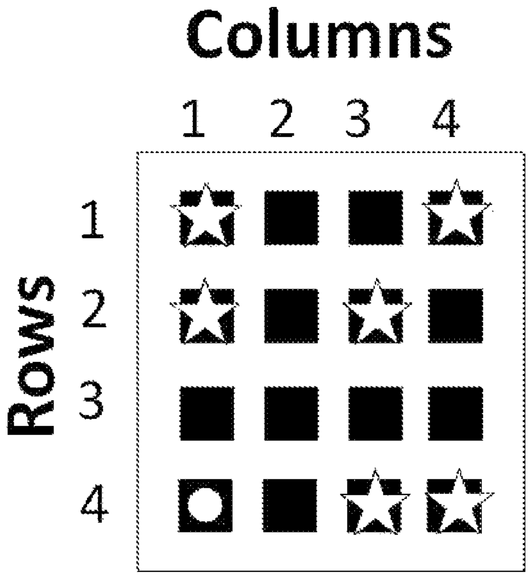

[Fig. 11]
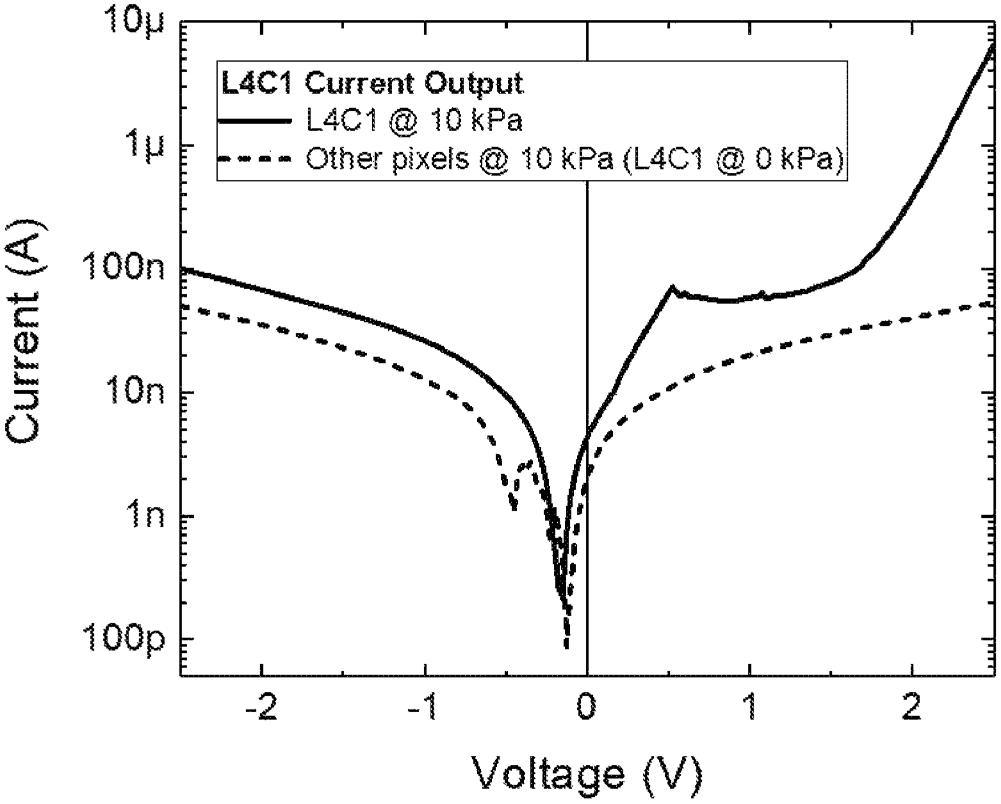
[Fig. 12]
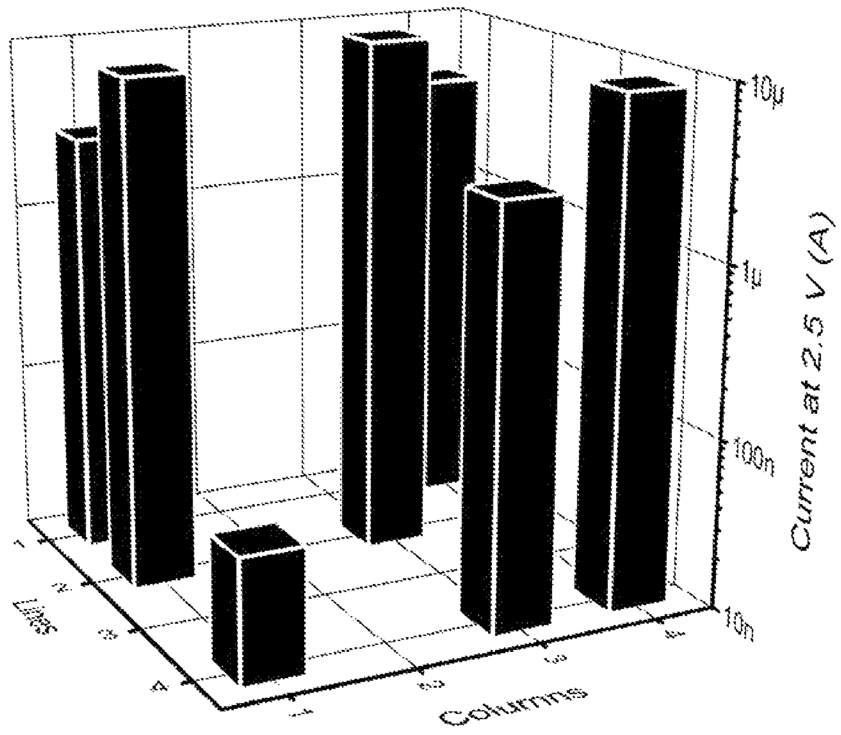

[Fig. 13]
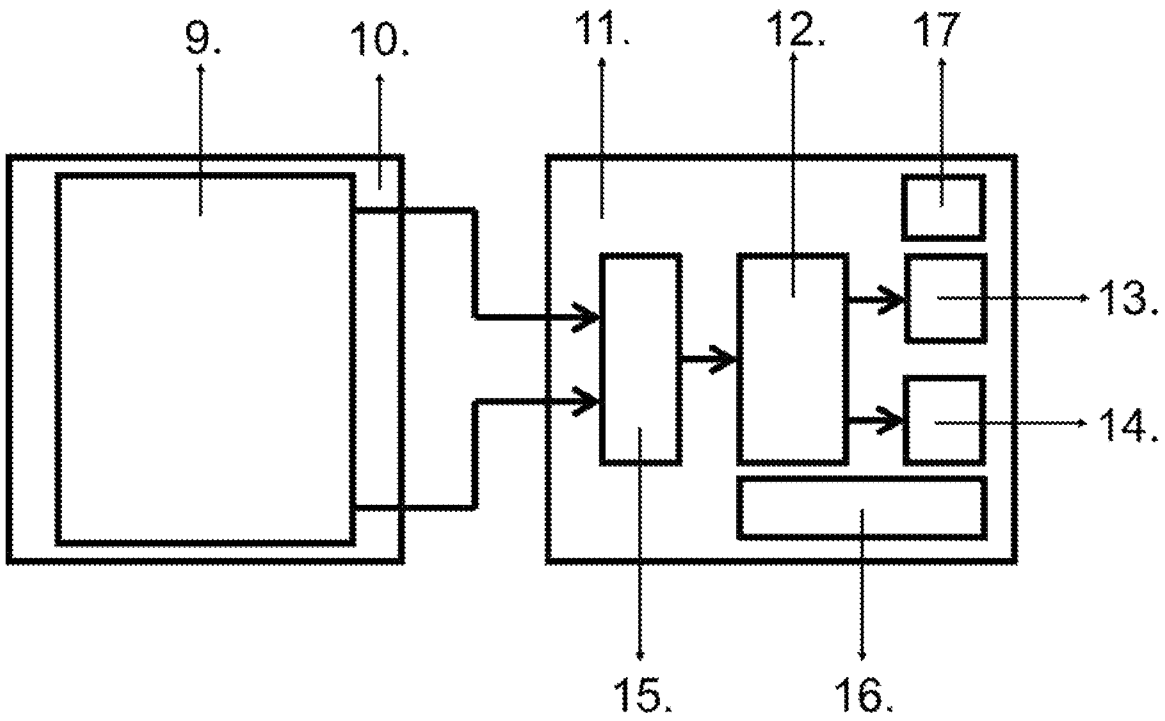
[Fig. 14]
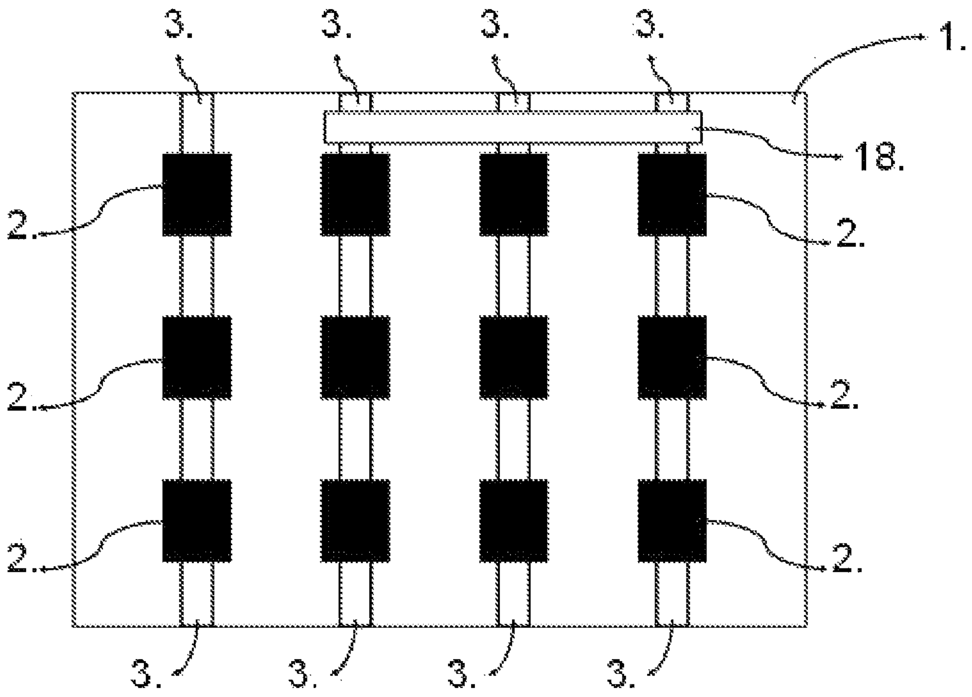

[Fig. 15]
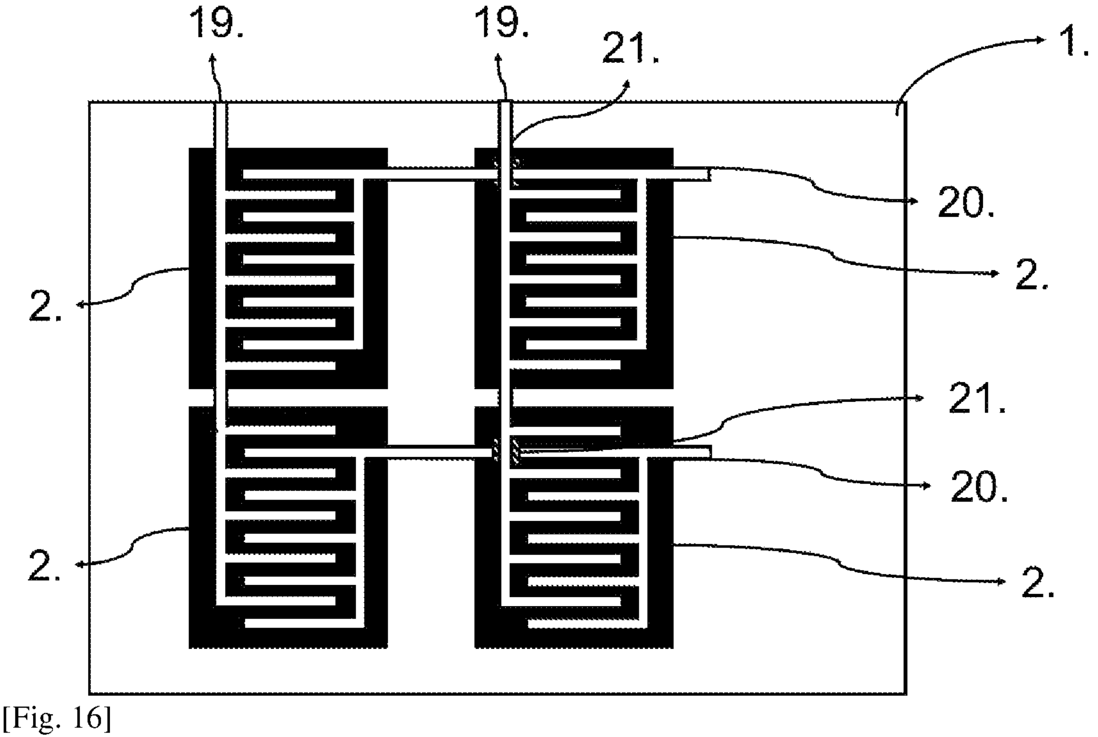
[Fig. 16]
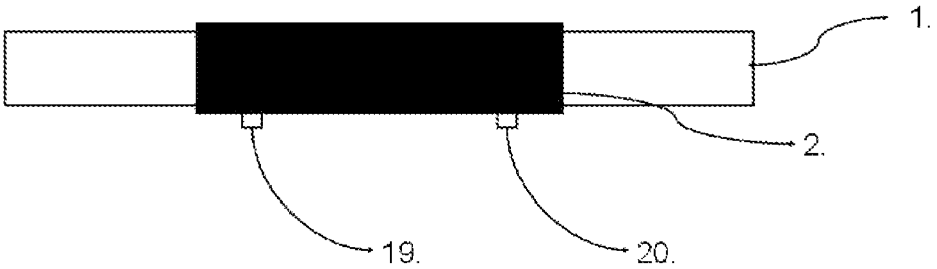
[Fig. 17]
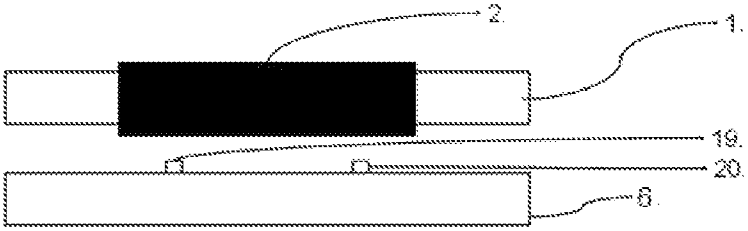

FLEXIBLE PRESSURE OR STRAIN MAPPING DEVICE, METHOD OF PREPARATION THEREOF, PRESSURE MAPPING SYSTEM, COMPUTER-IMPLEMENTED METHOD OF DIGITALIZATION AND VISUALIZATION IN REAL-TIME OF GRAPHICAL REPRESENTATIONS, COMPUTER PROGRAM, AND COMPUTER-READABLE DATA CARRIER

TECHNICAL FIELD

The present invention refers to a flexible pressure or strain mapping device, which is configured to carry out the electrical detection of different physical stimuli, such as pressure, strain, touch, and elongation.

BACKGROUND ART

The number of sensing devices surrounding us is growing quickly, in part due to the spread of the Internet of Things (IoT) and the adoption of wearable devices. Amongst the plethora of sensors, pressure sensors play a crucial role in several applications, from health monitoring, by detecting several physiological signals such as pulse, breath, and other muscle movements to a robotic skin, functional prostheses, and human-machine interfaces. However, with the growing production of wearables and other small electronic devices, electronic waste is becoming a serious burden, highlighting the need to identify more eco-friendly and sustainable materials. The fabrication processes are also critical when producing these sensing devices, which has instigated research towards low-cost, simple, and scalable sensor processes, such as screen-printing.

Pressure sensors commonly rely on piezoresistive or capacitive transduction mechanisms to transform a mechanical input into an electrical signal. The sensitivity, hysteresis, and response and recovery times of pressure sensors are frequently improved by micro-structuring some of their components, namely the sensing film or the electrodes.

SUMMARY OF INVENTION

In the first aspect, the present invention refers to a flexible pressure or strain mapping device comprising:

- a fibrous substrate layer (1), which comprises at least a layer zone impregnated with a hydrogel (2);
- at least a first sensor electrode (3) having a portion contacting at least a lower part of said layer zone impregnated with a hydrogel (2);
- at least a second sensor electrode (4) having a portion contacting at least an upper part of said layer zone impregnated with a hydrogel (2); and wherein
- said hydrogel is a cellulose derivative; and the cellulose derivative hydrogel is selected from the group consisting of cellulose acetate, cellulose acetate phthalate, cellulose acetate butyrate, cellulose acetate trimellitate, hydroxypropyl methylcellulose phthalate, methylcellulose, ethyl cellulose, hydroxyethyl cellulose, carboxymethyl cellulose, sodium carboxymethyl cellulose, hydroxypropyl cellulose, hydroxypropyl methylcellulose, their composites or their composites with natural polymers, polyvinyl alcohol, polyelectrolyte complexes, interpenetrating polymer network, cellulose-inorganic hybrid hydrogels, or their mixtures or their composites.

Alternatively, in the first aspect, as illustrated in FIG. 16, the present invention refers to a flexible pressure or strain mapping device comprising:

- a fibrous substrate layer (1), which comprises at least a layer zone impregnated with a hydrogel (2); and
- at least a first interdigitated electrode (19) having a portion contacting at least a part of said layer zone impregnated with a hydrogel (2); and
- at least a second interdigitated electrode (20) having a portion contacting at least the same part of said layer zone impregnated with a hydrogel (2), which is contacted by said first interdigitated electrode (19); wherein said part of the layer zone impregnated with a hydrogel (2) is selected from its lower part or its upper part; and with the proviso that at least an electrically insulating layer (21) separates the first interdigitated electrode (19) and the second interdigitated electrode (20) from each other when a plurality of pairs of the first interdigitated electrode (19) and the second interdigitated electrode (20) are comprised in said flexible pressure or strain mapping device; and wherein
- said hydrogel is a cellulose derivative; and the cellulose derivative hydrogel is selected from the group consisting of cellulose acetate, cellulose acetate phthalate, cellulose acetate butyrate, cellulose acetate trimellitate, hydroxypropyl methylcellulose phthalate, methylcellulose, ethyl cellulose, hydroxyethyl cellulose, carboxymethyl cellulose, sodium carboxymethyl cellulose, hydroxypropyl cellulose, hydroxypropyl methylcellulose, their composites or their composites with natural polymers, polyvinyl alcohol, polyelectrolyte complexes, interpenetrating polymer network, cellulose-inorganic hybrid hydrogels, or their mixtures or their composites.

The present invention, in a second aspect, refers to a method of preparation of a flexible pressure or strain mapping device, as defined in the first aspect of the invention, comprising the following steps:

a) Depositing and impregnating a hydrogel in a fibrous substrate layer (1) forming at least a layer zone impregnated with a hydrogel (2); and
b) Connecting a portion of a first sensor electrode (3) to at least a lower part of said layer zone impregnated with a hydrogel (2); and
c) Connecting a portion of a second sensor electrode (4) to at least an upper part of said layer zone impregnated with a hydrogel (2).

Alternatively, in a second aspect, refers to a method of preparation of a flexible pressure or strain mapping device, as defined in the first aspect of the invention, comprising the following steps:

a) Depositing and impregnating a hydrogel in a fibrous substrate layer (1) forming at least a layer zone impregnated with a hydrogel (2); and
b) Connecting a portion of a first interdigitated electrode (19) to at least a part of said layer zone impregnated with a hydrogel (2); and
c) Connecting a portion of a second interdigitated electrode (20) to at least the same part of said layer zone impregnated with a hydrogel (2), which is contacted by said first interdigitated electrode (19); wherein said part of the layer zone impregnated with a hydrogel (2) is selected from its lower part or its upper part; and
d) separating the first interdigitated electrode (19) and the second interdigitated electrode (20) from each other by an electrically insulating layer (21) when a plurality of pairs of the first interdigitated electrode (19) and the second interdigitated electrode (20) are comprised in said flexible pressure or strain mapping device.

The present invention, in a third aspect, refers to a pressure mapping system comprising a pressure-sensitive surface (9), wherein said pressure sensitive surface (9) includes a flexible pressure mapping device, as defined in the first aspect of the invention, wherein said pressure mapping system further comprises:

an electronic instrumentation subsystem (11), which includes a data transmission and reception unit (15), a microcontroller (12), and a power supply; and a hybrid connector (10), which links said pressure-sensitive surface (9) to said electronic instrumentation subsystem (11); and wherein said data transmission and reception unit (15) receives data retrieved by the pressure-sensitive surface (9), and transmits said data to the microcontroller (12).

The present invention, in a fourth aspect, refers to a computer-implemented method of digitalization and visualization in real-time of graphical representations comprising the following steps:

a) Inputting a physical stimulus on a pressure-sensitive surface (9) comprised in the pressure mapping system, as defined in any of the claims 19 to 21; and b) Converting the physical stimuli into at least a digital signal by said pressure mapping system; and c) Transmitting the at least a digital signal by said pressure mapping system to a computer device, which forms a graphical representation of the physical stimuli, wherein said computer device is adapted to allow the edition of said graphical representations by means of a graphical user interface.

The present invention, in the fifth aspect, refers to a computer program comprising instructions which, when the program is executed by a computer device, cause the computing device to carry out the steps of the method defined in the fourth aspect.

The present invention, in the sixth aspect, refers to a computer-readable data carrier having stored thereon the computer program, as defined the in the fifth aspect.

Technical Problem

The international patent application No. WO2013113122A1 of Smart Skin Technologies INC., entitled "PRESSURE MAPPING AND ORIENTATION SENSING SYSTEM" and published on Aug. 8, 2013, describes a pressure, force, and orientation sensing system for mapping using an array of flexible electrodes and a flexible and resilient piezo-resistive material, such as fabrics coated with various types of conductive materials, conductive foams, nanotube-based polymers, carbon black based polymers, and graphite doped plastics. Each sensor is connected to an electronic circuit to measure its electrical resistance, and the data is sent to a microprocessor. The data can then be wirelessly sent to external devices, such as smartphones and computers, for processing, analysis, and user interaction.

There is a need to identify other piezo-resistive materials that contribute to precise and accurate measurements, be flexible, and preferably environmentally friendly materials.

Furthermore, the individual sensing element in the prior art may suffer from the cross-talking or ghosting effect, which affect the estimation of the mechanical stimuli distribution and may lead to misleading conclusions.

Solution to Problem

The present invention solves the problems of the prior art by impregnating a hydrogel in a fibrous substrate layer, forming a layer zone impregnated with a hydrogel, which is contacted to electrodes to allow properly the electrical measurement of physical stimuli applied over said fibrous layer.

The present invention solves the problems of prior art regarding the cross-talking or ghosting effect among the sensing elements by the individualization of the sensing layer instead of using a continuous sensing film with individualized electrodes. Another approach used by the present invention is the coupling of the sensing element with a rectifying element, to block the current flow through unwanted paths. The use of rectifying elements to the pressure-sensing elements typically requires the introduction of additional passivation layers to prevent short circuits between the terminals of the different elements.

Advantageous Effects of Invention

In the present invention, the hydrogels are an essential element of the flexible pressure or strain mapping device, namely when hydrogels are bio-based polymers or from natural-derived materials, which are viable sensing layers to produce sensing devices given their abundance, low cost, sustainability, recyclability, and flexibility. Moreover, hydrogels are interesting materials for sensing layers as they are flexible, and their performance regarding mechanical and sensing properties are easily tuned, so they can be stretchable and biocompatible, and may show self-healing properties.

Furthermore, the flexible pressure or strain mapping device can be arranged in arrays, to map a pressure or strain distribution and provide a more precise output in several applications.

In the incorporation of rectifying elements, the layered structure presented in this invention allows the addition of one rectifying element to each physical sensing element with the minimum amount possible of added layers. This fact avoids the need for additional passivation layers to prevent short circuits between the terminals of the different elements.

The flexible pressure or strain mapping device according to the present invention can provide resistive or capacitive measurements, considering that the term "or" is intended to mean an inclusive "or" rather than an exclusive "or." Therefore, the device of the present invention can provide measurements according to any of the following conditions: the flexible pressure or strain mapping can provide resistive measurements; the flexible pressure or strain mapping can provide capacitive measurements; or the flexible pressure or strain mapping can provide both capacitive and resistive measurements.

BRIEF DESCRIPTION OF DRAWINGS

To promote an understanding of the principles by the embodiments of the present invention, reference will be made to the embodiments illustrated in the figures and to the language used to describe the same. Anyway, it must be understood that there is no intention of limiting the scope of the present invention to the contents of the figures. Any alterations or later changes of the inventive features illustrated herein, and any additional application of the principles and embodiments of the invention shown, which would occur normally for one skilled in the art when reading this description, are considered as being within the scope of the claimed invention.

FIG. 1 illustrates a side view of the flexible pressure or strain mapping device in a one-substrate configuration;

FIG. 2 illustrates a side view of the flexible pressure or strain mapping device in a two-substrates configuration;

FIG. 3 illustrates a side view of the flexible pressure or strain mapping device in a three-substrates configuration;

FIG. 4 illustrates a top view of the flexible pressure or strain mapping device representing the first substrate with a bottom electrode on the backside of the substrate and the impregnated hydrogel on the front side;

FIG. 5 illustrates a top view of the flexible pressure or strain mapping device comprising a rectifying element comprising a Schottky metal contact, and a patterned semiconductor element, and a top electrode on the backside of the substrate;

FIG. 6 illustrates a side view of the flexible pressure or strain mapping device in a two-substrate configuration, wherein the first substrate includes the hydrogel-impregnated region and a bottom electrode, while the second substrate includes a Schottky metal contact, a patterned semiconductor, and a top electrode on the backside of the second substrate;

FIG. 7 illustrates a top view of the flexible pressure or strain mapping device in a two-substrate configuration, wherein the first substrate includes the hydrogel-impregnated region and a bottom electrode, while the second substrate includes a Schottky metal contact, a patterned semiconductor, and a top electrode on the backside of the second substrate;

FIG. 8 illustrates a side view of the flexible pressure or strain mapping device in a two-substrates configuration comprising a diode, wherein the first substrate includes the hydrogel-impregnated region and a bottom electrode, while the second substrate includes a Schottky metal contact deposited on the front side of the substrate, a patterned semiconductor impregnated in the substrate, and a top electrode on the backside of the second substrate;

FIG. 9 illustrates the dependence of the relative variation of the output electrical measurement about the applied pressure, showing sensitivity values on two regions of the curve;

FIG. 10 illustrates a scheme of a 4×4 array of physical sensing elements coupled with diodes. The six elements, where pressure was applied, are represented with white stars, while the element under measurement is represented with a white dot (Row 4—Column 1);

FIG. 11 illustrates Current-Voltage (IV) curves of one physical sensing element coupled with a diode (Row 4—Column 1) under a pressure of 10 kPa (in full line) and in the absence of pressure, while other six elements (Row 1—Column 1, Row 1—Column 4, Row 2—Column 1, Row 2—Column 3, Row 4—Column 3, Row 4—Column 4) are under a pressure of 10 kPa (in dashed line), from −2.5 V to +2.5 V;

FIG. 12 illustrates the current output, under a voltage of 2.5 V, of all the elements of an array when a pressure of 10 kPa is applied to six elements (Row 1—Column 1, Row 1—Column 4, Row 2—Column 1, Row 2—Column 3, Row 4—Column 3, Row 4—Column 4) in an orthogonal configuration to the element Row 4—Column 1;

FIG. 13 illustrates a block diagram of the pressure mapping system according to the invention, and its different elements, which are required for a smart surface embodiment;

FIG. 14 illustrates a top view of the flexible pressure or strain mapping device representing the first substrate with a bottom electrode on the backside of the substrate and the impregnated hydrogel on the front side, where some bottom electrodes are short-circuited by a conductive path to form a larger area sensitive to pressure;

FIG. 15 illustrates a top view of the flexible pressure or strain mapping device representing the first substrate with a group of first interdigitated electrodes and second interdigitated electrodes on the backside of the substrate and a group of impregnated hydrogel on the front side;

FIG. 16 illustrates a side view of the flexible pressure or strain mapping device representing the first fibrous substrate, which comprises a layer zone impregnated with a hydrogel, with a group of a first interdigitated electrode and a second interdigitated electrode contacting a lower part of the layer zone impregnated with hydrogel;

FIG. 17 illustrates a side view of the flexible pressure or strain mapping device representing the first fibrous substrate, which comprises a layer zone impregnated with a hydrogel, and a second fibrous substrate with a group of a first interdigitated electrode and a second interdigitated electrode on an upper part of the second fibrous substrate.

DESCRIPTION OF EMBODIMENTS

The present invention refers to a flexible pressure or strain mapping device comprising, as illustrated in FIG. 1:

- a fibrous substrate layer (1), which comprises at least a layer zone impregnated with a hydrogel (2); and
- at least a first sensor electrode (3) having a portion contacting at least a lower part of said layer zone impregnated with a hydrogel (2); and
- at least a second sensor electrode (4) having a portion contacting at least an upper part of said layer zone impregnated with a hydrogel (2); and wherein
- said hydrogel is a cellulose derivative; and the cellulose derivative hydrogel is selected from the group consisting of cellulose acetate, cellulose acetate phthalate, cellulose acetate butyrate, cellulose acetate trimellitate, hydroxypropyl methylcellulose phthalate, methylcellulose, ethyl cellulose, hydroxyethyl cellulose, carboxymethyl cellulose, sodium carboxymethyl cellulose, hydroxypropyl cellulose, hydroxypropyl methylcellulose, their composites or their composites with natural polymers, polyvinyl alcohol, polyelectrolyte complexes, interpenetrating polymer network, cellulose-inorganic hybrid hydrogels, or their mixtures or their composites.

Alternatively, the present invention refers to a flexible pressure or strain mapping device comprising, as illustrated in FIGS. 15 and 16:

- a fibrous substrate layer (1), which comprises at least a layer zone impregnated with a hydrogel (2); and
- at least a first interdigitated electrode (19) having a portion contacting at least a part of said layer zone impregnated with a hydrogel (2); and
- at least a second interdigitated electrode (20) having a portion contacting at least the same part of said layer zone impregnated with a hydrogel (2), which is contacted by said first interdigitated electrode (19); wherein said part of the layer zone impregnated with a hydrogel (2) is selected from its lower part or its upper part; and with the proviso that at least an electrically insulating layer (21) separates the first interdigitated electrode (19) and the second interdigitated electrode (20) from each other when a plurality of pairs of the first interdigitated electrode (19) and the second interdigitated electrode (20) are comprised in said flexible pressure or strain mapping device; and wherein said hydrogel is a cellulose derivative; and the cellulose derivative hydrogel is selected from the group consisting of cellulose acetate, cellulose acetate phthalate, cellulose acetate butyrate, cellulose acetate trimellitate, hydroxypropyl methylcellulose phthalate, methylcellulose, ethyl cellulose, hydroxyethyl cellulose, carboxymethyl cellulose, sodium carboxymethyl cellulose, hydroxypropyl cellulose, hydroxypropyl methylcellulose, their composites or their composites with natural polymers, polyvinyl alcohol, polyelectrolyte complexes, interpenetrating polymer network, cellulose-inorganic hybrid hydrogels, or their mixtures or their composites.

The present invention also refers to a method of preparation of a flexible pressure or strain mapping device comprising the following steps:

a) Depositing and impregnating a hydrogel in a fibrous substrate layer (1) forming at least a layer zone impregnated with a hydrogel (2); and
b) Connecting a portion of a first sensor electrode (3) to at least a lower part of said layer zone impregnated with a hydrogel (2); and
c) Connecting a portion of a second sensor electrode (4) to at least an upper part of said layer zone impregnated with a hydrogel (2).

Alternatively, the present invention also refers to a method of preparation of a flexible pressure or strain mapping device comprising the following steps:

a) Depositing and impregnating a hydrogel in a fibrous substrate layer (1) forming at least a layer zone impregnated with a hydrogel (2); and
b) Connecting a portion of a first interdigitated electrode (19) to at least a part of said layer zone impregnated with a hydrogel (2); and
c) Connecting a portion of a second interdigitated electrode (20) to at least the same part of said layer zone impregnated with a hydrogel (2), which is contacted by said first interdigitated electrode (19); wherein said part of the layer zone impregnated with a hydrogel (2) is selected from its lower part or its upper part; and
d) separating the first interdigitated electrode (19) and the second interdigitated electrode (20) from each other by an electrically insulating layer (21) when a plurality of pairs of the first interdigitated electrode (19) and the second interdigitated electrode (20) are comprised in said flexible pressure or strain mapping device.

The present invention also refers to a pressure mapping system comprising a pressure-sensitive surface (9), wherein said pressure-sensitive surface (9) includes a flexible pressure mapping device, as defined in the first aspect of the invention, wherein said pressure mapping system further comprises:

an electronic instrumentation subsystem (11), which includes a data transmission and reception unit (15), a microcontroller (12), and a power supply; and
a hybrid connector (10), which links said pressure-sensitive surface (9) to said electronic instrumentation subsystem (11); and
wherein said data transmission and reception unit (15) receives data retrieved by the pressure-sensitive surface (9), and transmits said data to the microcontroller (12).

The present invention uses an array, comprised of a plurality of first sensor electrodes (3) and second sensor electrodes (4), or a plurality of pairs of first interdigitated electrodes (19) and second interdigitated electrodes (20), and a plurality of layer zones impregnated with a hydrogel (2), which is configured for the electrical detection of different physical stimuli, such as pressure, strain, or elongation.

In the embodiments comprising a plurality of pairs of first interdigitated electrodes (19) and second interdigitated electrodes (20), an electrically insulating layer (21) separates said electrodes at their intersections to avoid a short-circuit between them. The electrically insulating layer (21) can be comprised of a non-charged hydrophobic polymer or a polycyclic aromatic hydrocarbon. More preferably, the electrically insulating layer (21) comprises at least one of the group consisting of a lipid polymer, a carbohydrate polymer, a modified carbohydrate polymer, a vinyl polymer, a polycyclic aromatic hydrocarbon, mixtures thereof, or, in the case of the recited polymers, copolymers thereof.

In the preferred embodiments of the invention, the flexible pressure or strain mapping device comprises a second fibrous substrate layer (5) with said second sensor electrode (4) arranged on a lower part of said second fibrous substrate layer (5), wherein said second sensor electrode (4) is simultaneously arranged and bonded over an upper part of said layer zone impregnated with a hydrogel (2), as it is illustrated in FIG. 2. Therefore, this second fibrous substrate layer (5) is placed on top of the layer zone impregnated with a hydrogel (2), ensuring the electrical contact between the top surface of the fibrous substrate layer (1) and the second sensor electrode (4), placed on the backside of the second fibrous substrate layer (5). Alternatively, the flexible pressure or strain mapping device comprises a second fibrous substrate layer (5) with said first interdigitated electrode (19) and said second interdigitated electrode (20) arranged on a lower part of said second fibrous substrate layer (5), wherein said first interdigitated electrode (19) and said second interdigitated electrode (20) are simultaneously arranged and bonded over said upper part of said layer zone impregnated with a hydrogel (2), and wherein the first interdigitated electrode (19) and the second interdigitated electrode (20) are separated from each other by an electrically insulating layer (21), as illustrated in FIG. 15. In these preferred embodiments, the method of preparation of a flexible pressure or strain mapping device further comprises a step of connecting and bonding a second fibrous substrate layer (5) with said second sensor electrode (4), which is arranged on a lower part of said second fibrous substrate layer (5), over an upper part of said zone impregnated with a hydrogel (2), wherein said second sensor electrode (4) is further arranged and bonded over said upper part of said layer zone impregnated with a hydrogel (2); or comprises a step of connecting a second fibrous substrate layer (5) with said first interdigitated electrode (19) and said second interdigitated electrode (20), which are arranged on a lower part of said second fibrous substrate layer (5), over an upper part of said zone impregnated with a hydrogel (2); wherein said first interdigitated electrode (19) and said second interdigitated electrode (20) are further arranged and bonded over said upper part of said layer zone impregnated with a hydrogel (2), and with the proviso that at least an electrically insulating layer (21) separates the first interdigitated electrode (19) and the second interdigitated electrode (20) from each other when a plurality of pairs of the first interdigitated electrode (19) and the second interdigitated electrode (20) are comprised in said flexible pressure or strain mapping device. The remaining portions of the second fibrous substrate layer (5), which are not connected and bonded over an upper part of said layer zone impregnated with a hydrogel (2), are connected and bonded over an upper part of said fibrous substrate layer (1).

In other preferred embodiments of the present invention, the flexible pressure or strain mapping device comprises a third fibrous substrate layer (6) with said first sensor electrode (3) arranged on an upper part of said third fibrous substrate layer (6), which is simultaneously arranged and bonded under a lower part of said zone impregnated with a hydrogel (2), as it is illustrated in FIG. 3. The remaining portions of the third fibrous substrate layer (6), which are not connected and bonded over a lower part of said zone impregnated with a hydrogel (2), are connected and bonded over a lower part of said fibrous substrate layer (1). Alternatively, the flexible pressure or strain mapping device comprises a third fibrous substrate layer (6) with said first interdigitated electrode (19) and said second interdigitated electrode (20) arranged on an upper part of said third fibrous substrate layer (6), wherein said first interdigitated electrode (19) and said second interdigitated electrode (20) are simultaneously arranged and bonded under said lower part of said layer zone impregnated with a hydrogel (2), as it is illustrated in FIG. 17. Similarly, to the embodiment of FIG. 15, at least an electrically insulating layer (21) separates the first interdigitated electrode (19) and the second interdigitated electrode (20) from each other when a plurality of pairs of the first interdigitated electrode (19) and the second interdigitated electrode (20) are comprised in said flexible pressure or strain mapping device. In these preferred embodiments, the method of preparation of a flexible pressure or strain mapping device further comprises a step of connecting and bonding a third fibrous substrate layer (6) with said first sensor electrode (3), which is arranged on an upper part of said third fibrous substrate layer (6), under a lower part of said zone impregnated with a hydrogel (2), wherein said first sensor electrode (3) is further arranged and bonded over said lower part of said layer zone impregnated with a hydrogel (2); or comprises a step of connecting a third fibrous substrate layer (6) with said first interdigitated electrode (19) and said second interdigitated electrode (20), which are arranged on an upper part of said third fibrous substrate layer (6), under a lower part of said zone impregnated with a hydrogel (2), wherein said first interdigitated electrode (19) and said second interdigitated electrode (20) are further arranged and bonded under said lower part of said layer zone impregnated with a hydrogel (2), with the proviso that the first interdigitated electrode (19) and the second interdigitated electrode (20) are separated from each other by an electrically insulating layer (21) when a plurality of pairs of the first interdigitated electrode (19) and the second interdigitated electrode (20) are comprised in said flexible pressure or strain mapping device.

The structure illustrated in FIG. 3 is achieved through the contact of the bottom first sensor electrode (3) of the third fibrous substrate layer (6) with the first fibrous substrate layer (1) with a zone impregnated with a hydrogel (2) bottom surface, and the contact of the top second sensor electrode (4) of the second fibrous substrate layer (5) with the layer zone impregnated with a hydrogel (2) top surface. In this preferred embodiment, the method of preparation of a flexible pressure or strain mapping device further comprises a step of connecting and bonding a third fibrous substrate layer (6) with said first sensor electrode (3) under a lower part of said zone impregnated with a hydrogel (2).

In other embodiments according to the present invention, the flexible pressure or strain mapping device comprises a rectifying element, which includes a conductive component (7) and a semiconductor component (8), wherein said semiconductor component (8) is connected to at least one of the group consisting of the first sensor electrode (3), the second sensor electrode (4), the first interdigitated electrode (19), or the second interdigitated electrode (20); and said conductive component (7) is connected to said semiconductor component (8), as it is illustrated in FIG. 5, 6, 7 or 8. In this preferred embodiment, the method of preparation of a flexible pressure or strain mapping device further comprises a step of connecting a rectifying element, which includes a conductive component (7) and a semiconductor component (8), to at least one of the group consisting of the first sensor electrode (3), the second sensor electrode (4), the first interdigitated electrode (19), or the second interdigitated electrode (20).

In the preferred embodiments of the present invention, the flexible pressure or strain mapping device comprises at least an array of a plurality of at least one of the group consisting of the first sensor electrode (3), the second sensor electrode (4), the first interdigitated electrode (19), or the second interdigitated electrode (20); and wherein each one of the first sensor electrode (3) or the second sensor electrode (4), which are comprised in the array, contacts at least a lower part or an upper part of a plurality of layer zones impregnated with a hydrogel (2); and wherein each one of the first interdigitated electrode (19), or the second interdigitated electrode (20), which are comprised in the array, contacts at least the same part, selected from the lower part or the upper part, of a plurality of layer zones impregnated with a hydrogel (2), with the proviso that the first interdigitated electrode (19) and the second interdigitated electrode (20) are separated from each other by an electrically insulating layer (21) when a plurality of pairs of the first interdigitated electrode (19) and the second interdigitated electrode (20) are comprised in said flexible pressure or strain mapping device. More preferably, a plurality of first sensor electrodes (3), or a plurality of pairs of first interdigitated electrodes (19) and second interdigitated electrodes (20) are arranged in parallel, and wherein each one of the first sensor electrodes (3), or each one of the pairs of first interdigitated electrodes (19) and second interdigitated electrodes (20) contacts at least a lower part of a plurality of layer zones impregnated with a hydrogel (2), with the proviso that the first interdigitated electrode (19) and the second interdigitated electrode (20) are separated from each other by an electrically insulating layer (21) when a plurality of pairs of the first interdigitated electrode (19) and the second interdigitated electrode (20) are comprised in said flexible pressure or strain mapping device, forming a planar structure, which is configured to enable the detection of physical stimuli selected from a group consisting of a pressure or a strain, as illustrated in FIG. 4.

In other embodiments, in the flexible pressure or strain mapping device, a plurality of second sensor electrodes (4), or a plurality of pairs of first interdigitated electrodes (19) and second interdigitated electrodes (20) are arranged in parallel, and wherein each one of the second sensor electrodes (4), or each one of the pairs of first interdigitated electrodes (19) and second interdigitated electrodes (20) contacts at least an upper part of a plurality of layer zones impregnated with a hydrogel (2), with the proviso that the first interdigitated electrode (19) and the second interdigitated electrode (20) are separated from each other by an electrically insulating layer (21) when a plurality of pairs of the first interdigitated electrode (19) and the second interdigitated electrode (20) are comprised in said flexible pressure or strain mapping device, forming a planar structure, which is configured to enable the detection of physical stimuli selected from a group consisting of a pressure or a strain.

The electrical connection in series of different bottom and top electrodes in either rows or columns enables the formation of an array configuration of different layer zones impregnated with a hydrogel (2). This planar (XY) structure enables the detection of the exact position of the physical stimuli on the surface of the layer zones impregnated with a hydrogel (2). Preferably, said rows or columns are arranged orthogonally among themselves, wherein each row or column comprises a plurality of physical sensors, namely layer zones impregnated with a hydrogel (2) and electrodes (3,4).

As an exemplary embodiment of a reading protocol, the output of each physical sensing element, layer zone impregnated with a hydrogel (2), and the electrodes, of the array is read by supplying a specific voltage pulse (with the duration from 1 μs to 10 s and the magnitude from 0.01 to 5 V). The pulse is supplied by a microcontroller and delivered by a multiplexer to the rows or columns of the physical sensing element. After going through the physical sensing element, the pulse is received by the microcontroller analog pin, also using a multiplexer, to select which row or column should be selected. Once in the microcontroller, the analog signal is converted to a digital signal and presented in a graphical array with a refresh rate from 1 ms to 10 s considering a 20×20 array in terms of physical sensing elements.

Still, the connection among several layer zones impregnated with a hydrogel (2) and electrodes can create crosstalk and ghosting effects in an array when these are linked to the same electrode row or column.

In the case of crosstalk, one element of the array can detect an input even when a pressure or a strain stimulus is not directly applied to this element, but to a surrounding element. This phenomenon is particularly critical when the sensing component of the device is a continuous material. One strategy to reduce this effect relies on the impregnation of the hydrogel in selected and discrete layer zones impregnated with a hydrogel (2). As each physical sensing element is individualized, the response of the different elements will be separated from the surrounding elements. In the case of ghosting, this phenomenon may occur due to the possibility of current flowing in both directions of a physical sensing element, leading to conduction paths formed by other pressed elements.

In the preferred embodiments according to the invention, both the crosstalk and ghosting problems can be solved through the incorporation of a rectifying element in each element of the sensing array. A rectifying element is an electronic component with two terminals, which allows the passage of current in a specific direction (forward direction). This is particularly relevant for an element with an extremely low resistance to the current in the forward direction, while it presents a very high resistance in the opposite direction (reverse). In the case of a preferred embodiment wherein the rectifying element is a Schottky diode, also known as a Schottky barrier diode, a potential energy barrier for electrons is formed at a metal-semiconductor junction, forming a rectifying diode. Another type of rectifying elements can also be integrated, such as pn junctions and two-coupled transistors.

Therefore, in the preferred embodiments, the flexible pressure or strain mapping device comprises an array of a plurality of said rectifying elements, wherein each conductive component (7) is disposed orthogonally in relation to at least one of the group consisting of the first sensor electrode (3), the second sensor electrode (4), or a pair of a first interdigitated electrode (19) and a second interdigitated electrode (20), as illustrated in FIG. 5 or 7.

The integration of a rectifying element, for example, a Schottky diode, in series with each electrode and layer zones impregnated with a hydrogel (2) will block the current flow through unwanted paths, thus reducing or eliminating the crosstalk and ghosting effects in other physical sensing elements. These advantages of reduction of crosstalk and ghosting effects are shown in FIGS. 11 and 12, with the scheme representing the pressure patterns in FIG. 10. The current values of the selected element (Row 4—Column 1) at a positive applied voltage of 2.5 V, are drastically different between the two different configurations of FIG. 11. When only this element is being pressed with 10 kPa, as represented by the full line of FIG. 11, the current values are above 6 μA, which is more than 100 times higher than the current values when the other six elements in an orthogonal configuration are being pressed instead, as illustrated by the dashed line of FIG. 11, which are around 50 nA. In the case of FIG. 12, we can observe the current values at 2.5 V of the six different elements (Row 1—Column 1, Row 1—Column 4, Row 2—Column 1, Row 2—Column 3, Row 4—Column 3, Row 4—Column 4) when they are being pressed, which are at least 50 times higher than the current values at the element not pressed (Row 4—Column 1). These facts confirm the reduction of the ghosting effect in the element being read (Row 4—Column 1), with the presence of a coupled rectifying element.

Preferably, the second fibrous substrate layer (5) will comprise a Schottky metal contact deposited on the backside of the substrate, followed by a patterned deposition of a semiconductor component (8) and a second sensor electrode (4), as shown in the top view in FIG. 5. The Schottky diode is formed between the Schottky metal contact and the semiconductor, while the second electrode ensures an ohmic contact with the semiconductor.

The combination of the two electrical elements, a physical sensor including the first sensor electrode (3), the second sensor electrode (4), the layer zone impregnated with a hydrogel (2), and a rectifying element, occurs by the placement of the second fibrous substrate layer (5), which contains the rectifying element, on top of the layer zone impregnated with a hydrogel (2), ensuring the electrical contact between the top surface of the fibrous substrate layer (1) with the impregnated hydrogel and the top second sensor electrode (4) at the bottom surface of the second fibrous substrate layer (5). The side view and top view of the two substrates configuration are shown in FIG. 6 and FIG. 7, respectively, with the coupled sensing element and diode.

This architecture is possible to be realized due to several characteristics of the different components. Since the fibrous substrate layer (1) has specific regions with transversal electrical conduction due to the impregnation of the hydrogel, it is possible to deposit the bottom first sensor electrode (3) on the bottom surface of the fibrous substrate layer (1). This fact will annul the chances of short-circuit between the first sensor electrode (3) and the second sensor electrode (4) on the terminals of the physical sensor. Furthermore, the separation of the physical sensor element, which comprises the two electrodes and layer zone impregnated with a hydrogel (2), from the Schottky diode in different substrates as well as the separation of the physical sensor element from the Schottky diode in the XY plane will also contribute to a more robust technology. In case of an alignment between the Schottky diode and the physical sensor, electrical contact between the semiconductor component (8) and the hydrogel would be established, creating parasitic currents and a loss of device performance. This architecture allows a planar separation of the two elements without the addition of further material depositions for passivation.

This architecture also enables the direction of both terminal electrodes to be facing the same side, in the preferred embodiment presented, the bottom surface, allowing simple integration of the device with the communication electronic elements. Therefore, the architecture here presented ensures technical advantages such as reduction of short-circuit chances, avoidance of direct contact between the hydrogel and the semiconductor component (8), the minimum number of layered materials, and, therefore, the minimum amount of deposition steps.

Moreover, another structure is proposed to combine the physical sensor and the rectifying element, while taking advantage of the porous characteristics of fibrous substrate layers. As the hydrogel is impregnated in the fibrous substrate layer (1), the semiconductor component (8) can also be impregnated in certain regions of the second fibrous substrate layer (5). A side view structure is presented in FIG. 8, showing the conductive component (7) of the rectifying element and the second sensor electrode (4) on different sides of the layer zone impregnated with a hydrogel (2). The main advantage of this configuration is the reduction of short-circuit between the two electrodes of, for example, the diode (Schottky metal and ohmic contact), which can occur from the methods of deposition, while maintaining the previous gains described.

Hydrogel is a piezo-responsive material, which can be defined as a three-dimensional (3D) network of hydrophilic polymers that can swell in water and retain a large amount of water while maintaining its structure, due to chemical or physical cross-linking of individual polymer chains.

Several hydrogels may be selected according to their sustainable features regarding recycling or compostability, namely hydrogels comprising cellulose-based biopolymers.

In the most preferred embodiments, the hydrogel is a cellulose derivative hydrogel. More preferably, the cellulose derivative hydrogel is selected from the group consisting of cellulose acetate, cellulose acetate phthalate, cellulose acetate butyrate, cellulose acetate trimellitate, hydroxypropyl methylcellulose phthalate, methylcellulose, ethyl cellulose, hydroxyethyl cellulose, carboxymethyl cellulose, sodium carboxymethyl cellulose, hydroxypropyl cellulose, hydroxypropyl methylcellulose, their composites or their composites with natural polymers, polyvinyl alcohol, polyelectrolyte complexes, interpenetrating polymer network, cellulose-inorganic hybrid hydrogels or their mixtures or their composites. In the most preferred embodiments, the cellulose derivative hydrogel is carboxymethyl cellulose or sodium carboxymethyl cellulose.

The hydrogels, as described above, are formed through a chemical or physical cross-linking of individual polymer chains. The chemical crosslinking can be achieved when the polymer is combined through a chemical reaction with ionic salts composed of an anion (mono, di, or trivalent) and a cation (mono, di, or trivalent). Other forms of chemical cross-linking are also possible, such as covalent crosslinking, as it will be understood by a person skilled in the art.

In the preferred embodiments according to the present invention, the layer zone impregnated with a hydrogel (2) includes at least a salt in the hydrogel matrix, wherein said salt includes a cation selected from a group consisting of a monovalent cation, a divalent cation, or a trivalent cation, which are used as ionic-crosslinkers, wherein said cations are preferably zinc, calcium, magnesium, nickel or copper cations. The most preferred salts employed in the present invention are zinc or calcium, which are classified as non-toxic and non-critical materials regarding environmental issues.

In the preferred embodiments according to the present invention, at least one of the group consisting of the first sensor electrode (3) or the second sensor electrode (4) is selected from the group consisting of an electrically conductive material, such as carbon, silver, gold, platinum, copper, aluminum, or their alloys, or a conductive polymer or copolymer, for example, polyaniline or poly (3,4-ethylene dioxythiophene) polystyrene sulfonate (PEDOT: PSS). These conductive materials ensure electrical connection between elements and create a rectifying element.

In the preferred embodiments according to the present invention, at least one of the group consisting of the first sensor electrode (3) or the second sensor electrode (4) is selected from the group consisting of a ribbon, a strip, or a wire.

In the preferred embodiments according to the present invention, the rectifying element comprises a Schottky diode and the conductive component (7) is selected from the group consisting of a Schottky metal contact, or a conductive polymer or copolymer, for example, polyaniline or poly (3,4-ethylene dioxythiophene) polystyrene sulfonate, wherein the Schottky metal contact is selected from the group consisting of silver, gold, platinum, palladium or alloys comprising said metallic elements; and wherein the semiconductor component (8) of the Schottky diode is selected from the group consisting of a n-type zinc oxide, a n-type zinc tin oxide, a n-type indium gallium zinc oxide, or a n-type silicon-based semiconductor. The second contact of the Schottky diode is an ohmic contact, selected from the group consisting of carbon, aluminum, tin, or alloys comprising said elements. In the most preferred embodiments according to the invention, the Schottky metal contact used is silver, the semiconductor component (8) is n-type zinc oxide (ZnO) deposited by screen-printing in a carboxymethylcellulose-based ink, and carbon is used as a second electrode (4).

The step of depositing and impregnating a hydrogel in a fibrous substrate layer (1) forming at least a layer zone impregnated with a hydrogel (2) may be carried out to form a pattern in specific regions of the fibrous substrate layer (1) to create individualized sensing elements.

Elastomers can be added to the fibrous substrate layer (1) to improve its mechanical properties, such as polyethylene glycol (PEG) or glycerol. Alternatively, fabrics or other fibrous structures, such as glass fibers, may also be used to improve the mechanical properties of the fibrous substrate layer (1).

In the preferred embodiments, the fibrous substrate layer (1) is an 80 $g\ m^{-2}$ paper layer. Alternatively, said paper layer can be covered by or incorporate cork, cloth fabric, cotton-based cloth, or mixtures thereof.

In the preferred embodiments, the flexible pressure or strain mapping device comprises a plurality of stacked fibrous substrate layers (1).

In other embodiments, a plurality of second fibrous substrate layer (5) may be stacked, wherein a second fibrous substrate layer (5) (n+1) is stacked over a second fibrous substrate layer (5) (*n*), wherein n is an integer superior or equal to 2. In this embodiment, the lower second fibrous substrate layer (5) with said second sensor electrode (4) is arranged and bonded over an upper part of said fibrous substrate layer (1).

In other embodiments, a plurality of third fibrous substrate layer (6) may be stacked, wherein a third fibrous substrate layer (6) (n+1) is stacked over a third fibrous substrate layer (6) (*n*), wherein n is an integer superior or equal to 2. In this embodiment, the higher third fibrous substrate layer (6) with said first sensor electrode (3) is arranged and bonded over a lower part of said fibrous substrate layer (1).

The cellulose-based hydrogels present a mechanical response to deformations due to two different properties: i) they are easily deformable when external forces are applied, and ii) the presence of different cations in the structure of the cellulose hydrogels creates percolation paths of electrical conduction in said materials. Therefore, when the hydrogel is subjected to pressure or strain, these materials can be used as active layers in an electrical pressure or strain sensor. The sensing method can be based on the measurement of intrinsic changes in resistance (continuous current), impedance (alternate current), or capacitance of the hydrogel, as well as changes in voltage or current of an electrical signal applied to the hydrogel.

The electrical measurements of these changes must be achieved with the incorporation of electrodes, establishing a physical sensing element composed of the layer zone impregnated with a hydrogel (2) with two different electrodes in the top and bottom surfaces, namely at least a first sensor electrode (3) and at least a second sensor electrode (4). Due to the impregnation feature of the hydrogel in the fibrous substrate layer (1), different electrodes structures are possible, as shown in FIGS. 1, 2, and 3, and here described:

In the preferred embodiments according to the present invention, any one of the fibrous substrate layer (1), the second fibrous substrate layer (5), or the third fibrous substrate layer (6) is selected from a group consisting of a paper product comprising a cellulose fiber based porous structure; a woven fabric; an unwoven fabric; a silicone aerogel; a polyurethane aerogel; a silicone foam; a melamine foam; a polyurethane foam; a nickel foam; a sea sponge, for example, a *Phylum porifera* sponge, a polyurethane sponge, a silicone sponge, a wood-based sponge, a cork substrate, or their composites or derivatives. Therefore, any one of the fibrous substrate layer (1), the second fibrous substrate layer (5), or the third fibrous substrate layer (6) includes, but is not limited to electrically insulating fibrous substrates. Therefore, the fibrous substrate layer (1) zones that are not impregnated with hydrogels maintain their electrically insulating properties.

The preferred method of preparation of the flexible pressure or strain mapping device according to the present invention is centered on printing or drop-on-demand methods. This enables large-scale production of the flexible pressure or strain mapping device, with the possibility to deposit a hydrogel on various substrates, namely metals, alloys, glass, polymers, composites, paper, and fabrics while maintaining reduced costs of production. The drop-on-demand methods are compatible with large areas.

In other embodiments of preparation of the flexible pressure or strain mapping device according to the present invention, it is possible to carry out the deposition step by a film application step, for example, a Doctor blade; by a screen printing step; by a flexography step; by a spray-coating step; or by an inkjet, a Roll-to-Roll (R2R) compatible, step, as it will be understood by a person skilled in the art. Several methods that can be employed in the deposition step are described in Johanna Zikulnig, Jurgen Kosel, "Flexible Printed Sensors—Overview of Fabrication Technologies", Reference Module in Biomedical Sciences, Elsevier, 2021.

In the most preferred embodiments according to the present invention, the hydrogel is incorporated and impregnated in a fibrous substrate layer (1), for example, commercial paper or fabric substrates, using thermal treatments below 100° C. to produce an active layer zone impregnated with a hydrogel (2).

Therefore, the use of paper or fabric-based fibrous substrate layer (1) allows the impregnation of other materials, like the biopolymer hydrogels, inside the substrate's structure. In this impregnation method, the porous substrate composed of fibers or treads will be surrounded by the polymeric component throughout the substrate's thickness.

The method of preparation according to the present invention also enables the individualization of the hydrogel, as the polymeric component can be deposited only at selected and defined regions of the fibrous substrate layer (1), for example, paper or fabric substrates. This procedure will create electrically conductive regions on the fibrous substrate layer (1) in a transversal direction to the substrate surface. Therefore, paths for electrical conduction will be formed from the top surface of the fibrous substrate layer (1) to the bottom one, enabling the deposition of electrodes on both sides of a substrate. Moreover, the deposition and impregnation of electrical insulating material in the substrate can also be established in selected regions to improve the patterning of the hydrogel and to reduce the ionic conductivity of natural fibers substrates. Said insulating materials can be hydrophobic polymers that increase the impermeabilization of water-based materials. More specifically, said insulating materials may be waxes, which are organic compounds insoluble in water that are lipophilic and malleable solids at ambient temperature, and present melting points above 40° C.

Additionally, the impregnation of the hydrogel on the fibrous substrate layer (1) creates a symbiotic phenomenon to the physical stimuli detection, as the fibrous substrate layer (1), for example, paper or fabric fibrous structures, provide mechanical stability to the hydrogel formed inside them.

The embodiments of the present invention comprising an array of physical sensors, namely layer zones impregnated with a hydrogel (2) and electrodes, coupled with rectifying elements can be applied for different mechanical deformation measurements. The surface of the array can be used for the detection of the presence of an object on its top, being able to determine the object's position, besides its shape, weight, and, therefore, several different objects on top. The feasible objects include consumer goods, stored products, museum objects, and any other uses where the position, shape, weight, and/or presence of the objects are important to be determined and monitored, to control stocks. Moreover, other applications such as the determination of the amount of a liquid in a vessel or the presence of a person or a living being, for example, an animal, on top of a certain surface are also possible.

In other preferred embodiments according to the present invention, as illustrated in FIG. 14, a plurality of sensing elements, namely layer zones impregnated with a hydrogel (2), are interconnected by connecting at least one conductive path (18) to a plurality of electrodes selected from the group consisting of a first sensor electrode (3), a second sensor electrode (4), or a pair of a first interdigitated electrode (19) and a second interdigitated electrode (20). The conductive path (18) is selected from a group consisting of a conductive cable or a conductive strip. This embodiment is particularly advantageous when larger sensors are required, wherein the sensing elements can be easily grouped together by shortcircuiting the electrodes of the individual sensing elements by conductive paths (18). The conductive path (18) is preferably made of a material selected from the group consisting of an electrically conductive material, such as carbon, silver, gold, platinum, copper, aluminum, or their alloys; or a conductive polymer or copolymer, for example, polyaniline or poly (3,4-ethylene dioxythiophene) polystyrene sulfonate (PEDOT: PSS).

EXAMPLE

An exemplary formulation to be used in the method of preparation of a flexible pressure or strain mapping device comprises:

Sodium carboxymethyl cellulose—CMC (Sigma Aldrich Mw approximately 250,000): Solution concentration from about 0.1% to about 10.0% weight in water;

Calcium Chloride ($CaCl_2$)—Concentration from about 0.01 M to about 10.0 M in water;

Zinc Chloride ($ZnCl_2$)—Concentration from about 0.01 M to about 10.0 M in water. in water.

A flexible pressure or strain mapping device according to the present invention was prepared according to the following specifications:

Total sensible area of layer zones impregnated with a hydrogel (2): 400 $cm^2$;

Number of sensing elements including layer zones impregnated with a hydrogel (2): 400;

Area of each sensing element: 0.09 $cm^2$;

The minimum distance between sensing elements: 0.9 cm;

Sensitivity: $-10^{-2}$ $kPa^{-1}$, as illustrated in FIG. 9;

Limit of detection: 1 g;

Reduction of ghosting effect with Schottky diodes: >99%, as illustrated in FIG. 10 and FIG. 11;

Response and recovery time: <1 s;

Fatigue: 1000 number of pressure cycles;

Time stability: <10%.

The invention can also be applied in a touch and outline smart surface, sensitive to pressure or strain, for a drawing and touching interface, able to detect finger, pencil, pen, or other object movements on top of the surface, and for the recognition of handwriting.

The touch and outline smart surface is a pressure mapping system, according to the third aspect of the invention.

All physical interaction with the pressure mapping system can be digitized and visualized in real-time on a computer software interface. The physical interactions assume the use of hands, fingers, pencils, pens, and others, which can serve as a means of interaction between the user and the smart surface. Subsequently, the digital content can be programmed through an accessible language, especially graphics, allowing one to animate the content produced on the sensitive surface with movement and sounds, through the computer program. The embodiment is comprised of several functionalities that occur from the various constituent units of the system integrated into the three components of the system, which include a pressure sensitive surface (9) including a flexible pressure mapping device, as defined in the first aspect of the invention; a computer program; and a portable device for controlling the sensitive surface electronics and communicating between it and the computer program.

An embodiment of the pressure mapping system is represented in FIG. 13, which is comprised of the different elements: a pressure-sensitive surface (9); a hybrid connector (10); an electronic instrumentation system (11); a microcontroller (12); a remote communication unit (13); a data transmission and reception unit (15); and a power supply. In the preferred embodiments, in the pressure mapping system, the power supply comprises at least one of the group consisting of a charging unit (14) or a battery (16). In other embodiments, in the pressure mapping system, the electronic instrumentation subsystem (11) includes an acoustic sensor (17).

The pressure-sensitive surface (9) includes the flexible pressure mapping device, as defined in the first aspect of the invention.

The hybrid connector (10) links electrically the pressure-sensitive surface (9) to the electronic instrumentation subsystem (11) by means of electrodes, namely at least a first sensor electrode (3) and at least a second sensor electrode (4) comprised in the flexible pressure mapping device. The hybrid connector (10) can include elements such as needles, springs, clamps, alligator clips, or surface electrodes, which can be composed of conductive materials such as metals, such as gold, silver, aluminum, or copper.

As used in this description, the expressions “about” and “approximately” refer to a range in values of roughly 10% of the specified number.

As used in this description, the expression. “substantially” means that the real value is within an interval of about 10% of the desired value, variable or related limit, particularly within about 5% of the desired value, variable or related limit or particularly within about 1% of the desired value, variable or related limit.

Moreover, the term “or” is intended to mean an inclusive “or” rather than an exclusive “or.” That is unless specified otherwise, or clear from the context, the phrase “X employs A or B” is intended to mean any of the natural inclusive permutations. That is, the phrase “X employs A or B” is satisfied by any of the following instances: X employs A; X employs B; or X employs both A and B.

In addition, the articles “a” and “an” as used in this application and the appended claims should generally be construed to mean “one or more” unless specified otherwise or clear from the context to be directed to a singular form.

Further, as used herein, the term “exemplary” is intended to mean serving as an illustration or example of something and is not intended to indicate a preference.

The subject matter described above is provided as an illustration of the present invention and must not be interpreted to limit it. The terminology used to describe specific embodiments, according to the present invention, must not be interpreted to limit the invention. As used in this description, the definite and indefinite articles, in their singular form, aim to include in the interpretation the plural forms, unless the context of the description explicitly indicates the contrary. It will be understood that the expressions “comprise” and “include” when used in this description, specify the presence of the characteristics, the elements, the components, the steps, and the related operations, but do not exclude the possibility of other characteristics, elements, components, steps, and operations from being also contemplated.

All modifications, providing that they do not modify the essential features of the following claims, must be considered within the scope of protection of the present invention.

REFERENCE SIGNS LIST

1. a fibrous substrate layer;

2. a layer zone impregnated with a hydrogel;

3. a first sensor electrode;

4. a second sensor electrode;
5. a second fibrous substrate layer;
6. a third fibrous substrate layer;
7. a conductive component;
8. a semiconductor component;
9. a pressure-sensitive surface;
10. a hybrid connector;
11. an electronic instrumentation subsystem;
12. a microcontroller;
13. a remote communication unit;
14. a charging unit;
15. a data transmission and reception unit;
16. a battery;
17. an acoustic sensor;
18. a conductive path;
19. a first interdigitated electrode;
20. a second interdigitated electrode;
21. an electrically insulating layer.

CITATION LIST

The citation list is as follows:

Patent Literature

PTL1: International patent application No. WO2013113122A1 of Smart Skin Technologies INC., entitled "PRESSURE MAPPING AND ORIENTATION SENSING SYSTEM" and published on Aug. 8, 2013.

Non Patent Literature

NPL1: Johanna Zikulnig, Jurgen Kosel, "Flexible Printed Sensors-Overview of Fabrication Technologies", Reference Module in Biomedical Sciences, Elsevier, 2021.

The invention claimed is:

1. A flexible pressure or strain mapping device comprising:

a fibrous substrate layer, which comprises at least a layer zone impregnated with a hydrogel; and at least a first sensor electrode having a portion contacting at least a lower part of said layer zone impregnated with a hydrogel; and at least a second sensor electrode having a portion contacting at least an upper part of said layer zone impregnated with a hydrogel; and wherein said hydrogel is a cellulose derivative; and the cellulose derivative hydrogel is selected from the group consisting of cellulose acetate, cellulose acetate phthalate, cellulose acetate butyrate, cellulose acetate trimellitate, hydroxypropyl methylcellulose phthalate, methylcellulose, ethyl cellulose, hydroxyethyl cellulose, carboxymethyl cellulose, sodium carboxymethyl cellulose, hydroxypropyl cellulose, hydroxypropyl methylcellulose, their composites or their composites with natural polymers, polyvinyl alcohol, polyelectrolyte complexes, interpenetrating polymer network, cellulose-inorganic hybrid hydrogels, or their mixtures or their composites characterized by further comprising at least one of the group consisting of a second fibrous substrate layer or a third fibrous substrate layer; and wherein said second sensor electrode is arranged on a lower part of said second fibrous substrate layer, wherein said second sensor electrode is simultaneously arranged and bonded over an upper part of said layer zone impregnated with said hydrogel and wherein said first sensor electrode is arranged on an upper part of said third fibrous substrate layer, which is simultaneously arranged and bonded under a lower part of said zone impregnated with said hydrogel.

2. A flexible pressure or strain mapping device comprising:

a fibrous substrate layer, which comprises at least a layer zone impregnated with a hydrogel (2); and at least a first interdigitated electrode having a portion contacting at least a part of said layer zone impregnated with a hydrogel; and at least a second interdigitated electrode having a portion contacting at least the same part of said layer zone impregnated with a hydrogel, which is contacted by said first interdigitated electrode; wherein said part of the layer zone impregnated with a hydrogel is selected from its lower part or its upper part; and with the proviso that at least an electrically insulating layer separates the first interdigitated electrode and the second interdigitated electrode from each other when a plurality of pairs of the first interdigitated electrode and the second interdigitated electrode are comprised in said flexible pressure or strain mapping device; and wherein said hydrogel is a cellulose derivative; and the cellulose derivative hydrogel is selected from the group consisting of cellulose acetate, cellulose acetate phthalate, cellulose acetate butyrate, cellulose acetate trimellitate, hydroxypropyl methylcellulose phthalate, methylcellulose, ethyl cellulose, hydroxyethyl cellulose, carboxymethyl cellulose, sodium carboxymethyl cellulose, hydroxypropyl cellulose, hydroxypropyl methylcellulose, their composites or their composites with natural polymers, polyvinyl alcohol, polyelectrolyte complexes, interpenetrating polymer network, cellulose-inorganic hybrid hydrogels, or their mixtures or their composites characterized by further comprising at least one of the group consisting of a second fibrous substrate layer or a third fibrous substrate layer; and wherein said first interdigitated electrode and said second interdigitated electrode are arranged on a lower part of said second fibrous substrate layer, wherein said first interdigitated electrode and said second interdigitated electrode are simultaneously arranged and bonded over an upper part of said layer zone impregnated with said hydrogel, with the proviso that the first interdigitated electrode and the second interdigitated electrode are separated from each other by an electrically insulating layer when a plurality of pairs of the first interdigitated electrode and the second interdigitated electrode are comprised in said flexible pressure or strain mapping device; and wherein said first interdigitated electrode and said second interdigitated electrode are arranged on an upper part of said third fibrous substrate layer, wherein said first interdigitated electrode and said second interdigitated electrode are simultaneously arranged and bonded under a lower part of said layer zone impregnated with said hydrogel, with the proviso that the first interdigitated electrode and the second interdigitated electrode are separated from each other by an electrically insulating layer when a plurality of pairs of the first interdigitated electrode and the second interdigitated electrode are comprised in said flexible pressure or strain mapping device.

3. The flexible pressure or strain mapping device, according to claim 2, wherein a plurality of first sensor electrodes, or a plurality of pairs of first interdigitated electrodes and second interdigitated electrodes are arranged in parallel; and wherein each one of the first sensor electrodes, or each one of the pairs of first interdigitated electrodes and second interdigitated electrodes contacts at least a lower part of a plurality of layer zones impregnated with a hydrogel, forming a planar structure, which is configured to enable the detection of physical stimuli selected from a group consisting of a pressure or a strain.

4. A method of preparation of a flexible pressure or strain mapping device, as defined in claim 2, the method comprising the following steps:

a. Depositing and impregnating a hydrogel in a fibrous substrate layer forming at least a layer zone impregnated with a hydrogel; and b. Connecting a portion of a first interdigitated electrode to at least a part of said layer zone impregnated with said hydrogel; and c. Connecting a portion of a second interdigitated electrode to at least the same part of said layer zone impregnated with said hydrogel, which is contacted by said first interdigitated electrode; wherein said part of the layer zone impregnated with a hydrogel is selected from its lower part or its upper part; and d. separating the first interdigitated electrode and the second interdigitated electrode from each other by an electrically insulating layer when a plurality of pairs of the first interdigitated electrode and the second interdigitated electrode are comprised in said flexible pressure or strain mapping device characterized by further comprising at least one of the following steps:

a step of connecting a second fibrous substrate layer with said first interdigitated electrode and said second interdigitated electrode, which are arranged on a lower part of said second fibrous substrate layer, over an upper part of said zone impregnated with a hydrogel, wherein said first interdigitated electrode and said second interdigitated electrode are further arranged and bonded over said upper part of said layer zone impregnated with said hydrogel;

a step of connecting a third fibrous substrate layer with said first interdigitated electrode and said second interdigitated electrode, which are arranged on an upper part of said third fibrous substrate layer, under a lower part of said zone impregnated with a hydrogel, wherein said first interdigitated electrode and said second interdigitated electrode are further arranged and bonded under said lower part of said layer zone impregnated with said hydrogel.

5. The pressure mapping system, according to the previous claim 4, wherein the power supply comprises at least one of the group consisting of a charging unit or a battery.

6. The pressure mapping system, according to claim 4, wherein the electronic instrumentation subsystem includes an acoustic sensor.

7. The flexible pressure or strain mapping device, according to any one of claims 1 or 2, wherein comprises a rectifying element, which includes a conductive component and a semiconductor component, wherein said semiconductor component is connected to at least one of the group consisting of the first sensor electrode, the second sensor electrode, the first interdigitated electrode, or the second interdigitated electrode; and said conductive component is connected to said semiconductor component.

8. The flexible pressure or strain mapping device, according to claim 7, wherein comprises an array of a plurality of said rectifying elements, wherein each conductive component is disposed orthogonally in relation to at least one of the group consisting of the first sensor electrode, the second sensor electrode, or a pair of a first interdigitated electrode and a second interdigitated electrode.

9. The flexible pressure or strain mapping device, according to any one of claim 7, wherein a plurality of layer zones impregnated with a hydrogel, are interconnected by connecting at least one conductive path to a plurality of electrodes selected from the group consisting of a first sensor electrode, a second sensor electrode, or a pair of a first interdigitated electrode and a second interdigitated electrode.

10. The flexible pressure or strain mapping device, according to claim 7, wherein said rectifying element comprises a Schottky diode and the conductive component is selected from the group consisting of a Schottky metal contact, or a conductive polymer or copolymer, for example, polyaniline or poly (3,4-ethylene dioxythiophene) polystyrene sulfonate; wherein the Schottky metal contact is selected from the group consisting of silver, gold, platinum, palladium or alloys comprising said metallic elements; and wherein the semiconductor component of the Schottky diode is selected from the group consisting of a n-type zinc oxide, a n-type zinc tin oxide, a n-type indium gallium zinc oxide, or a n-type silicon-based semiconductor.

11. The flexible pressure or strain mapping device, according to any one of claims 1 or 2, wherein comprises at least an array of a plurality of at least one of the group consisting of the first sensor electrode, the second sensor electrode, the first interdigitated electrode, or the second interdigitated electrode; and wherein each one of the first sensor electrode or the second sensor electrode, which are comprised in the array, contacts at least a lower part or an upper part of a plurality of layer zones impregnated with a hydrogel; and wherein each one of the first interdigitated electrode, or the second interdigitated electrode, which are comprised in the array, contacts at least the same part, selected from the lower part or the upper part, of a plurality of layer zones impregnated with a hydrogel.

12. The flexible pressure or strain mapping device, according to claim 11, wherein a plurality of second sensor electrodes, or a plurality of pairs of first interdigitated electrodes and second interdigitated electrodes are arranged in parallel; and wherein each one of the second sensor electrodes, or each one of the pairs of first interdigitated electrodes and second interdigitated electrodes contacts at least an upper part of a plurality of layer zones impregnated with a hydrogel, forming a planar structure, which is configured to enable the detection of physical stimuli selected from a group consisting of a pressure or a strain.

13. The flexible pressure or strain mapping device, according to any one of claims 1 or 2, wherein the layer zone impregnated with a hydrogel includes at least a salt in the hydrogel matrix, wherein said salt includes a cation selected from a group consisting of a monovalent cation, a divalent cation, or a trivalent cation, which is used as an ionic-crosslinking, wherein said cations are preferably zinc, calcium, magnesium, nickel or copper cations, or their mixtures.

14. The flexible pressure or strain mapping device, according to any one of claims 1 or 10, wherein any one of the first fibrous substrate layer, the second fibrous substrate layer, or the third fibrous substrate layer is selected from a group consisting of a paper product comprising a cellulose fiber based porous structure; a woven fabric; an unwoven fabric; a silicone aerogel; a polyurethane aerogel; a silicone foam; a melamine foam; a polyurethane foam; a nickel foam; a sea sponge, for example, a *Phylum porifera* sponge, a polyurethane sponge, a silicone sponge, a wood-based sponge, a cork substrate, or their composites or derivatives.

15. The flexible pressure or strain mapping device, according to any one of claims 1 or 2, wherein at least one of the group consisting of the first sensor electrode or the second sensor electrode is selected from the group consisting of carbon, silver, gold, platinum, copper, aluminum, or their alloys; or a conductive polymer or copolymer, for example, polyaniline or poly (3,4-ethylene dioxythiophene) polystyrene sulfonate.

16. A method of preparation of a flexible pressure or strain mapping device, as defined in claim 1, the method comprising the following steps:

a. Depositing and impregnating a hydrogel in a fibrous substrate layer forming at least a layer zone impregnated with a hydrogel; and b. Connecting a portion of a first sensor electrode to at least a lower part of said layer zone impregnated with a hydrogel; and c. Connecting a portion of a second sensor electrode to at least an upper part of said layer zone impregnated with a hydrogel characterized by further comprising at least one of the following steps:

a step of connecting and bonding a second fibrous substrate layer with said second sensor electrode, which is arranged on a lower part of said second fibrous substrate layer, over an upper part of said zone impregnated with a hydrogel, wherein said second sensor electrode is further arranged and bonded over said upper part of said layer zone impregnated with a hydrogel;

a step of connecting and bonding a third fibrous substrate layer with said first sensor electrode, which is arranged on an upper part of said third fibrous substrate layer, under a lower part of said zone impregnated with a hydrogel, wherein said first sensor electrode is further arranged and bonded over said lower part of said layer zone impregnated with a hydrogel.

17. The method of preparation of a flexible pressure or strain mapping device, according to any one of the claims 16 or 4, wherein further comprises a step of connecting a rectifying element, which includes a conductive component and a semiconductor component (8), to at least one of the group consisting of the first sensor electrode, the second sensor electrode, the first interdigitated electrode, or the second interdigitated electrode.

18. A pressure mapping system comprising a pressure sensitive surface, characterized in that said pressure sensitive surface includes a flexible pressure mapping device, as defined in any one of the claims 1 or 2, wherein said pressure mapping system further comprises:

an electronic instrumentation subsystem, which includes a data transmission and reception unit, a microcontroller, and a power supply; and a hybrid connector, which links said pressure sensitive surface to said electronic instrumentation subsystem; and wherein said data transmission and reception unit receives data retrieved by the pressure-sensitive surface, and transmits said data to the microcontroller.

19. A computer-implemented method of digitalization and visualization in real time of graphical representations characterized by the fact that comprises the following steps:

a. Inputting a physical stimuli on a pressure-sensitive surface comprised in the pressure mapping system, as defined in claim 4; and b. Converting the physical stimuli into at least a digital signal by said pressure mapping system; and c. Transmitting the at least a digital signal by said pressure mapping system to a computer device, which forms a graphical representation of the physical stimuli, wherein said computer device is adapted to allow the edition of said graphical representations by means of a graphical user interface.

20. A computer program, characterized by comprising instructions which, when the program is executed by a computer device, cause the computing device to carry out the steps of the method defined in claim 19.

21. A computer-readable data carrier characterized by having stored thereon the computer program, as defined in claim 20.

* * * * *